United States Patent [19]

Tachikawa

[11] 3,968,553

[45] July 13, 1976

[54] METHOD OF MANUFACTURING A VALVE

[76] Inventor: Sakuji Tachikawa, No. 25, Futabacho, Itabashi, Tokyo, Japan

[22] Filed: Dec. 11, 1974

[21] Appl. No.: 531,834

[30] Foreign Application Priority Data
Dec. 17, 1973  Japan............................ 48-141606
Nov. 22, 1974  Japan............................ 49-134891

[52] U.S. Cl............................ 29/157.1 R; 251/367; 228/112
[51] Int. Cl.² .................... B23P 15/00; B23K 19/02
[58] Field of Search ............... 29/157.1 R, 470.3; 251/367, 366; 228/112, 113

[56] References Cited
UNITED STATES PATENTS

| | | | |
|---|---|---|---|
| 2,301,176 | 11/1942 | Elliott | 251/366 |
| 2,834,097 | 5/1958 | Eichenberg et al. | 29/157.1 R |
| 3,429,591 | 2/1969 | Loyd et al. | 29/470.3 |
| 3,484,926 | 12/1969 | Blum et al. | 29/470.3 |
| 3,618,196 | 11/1971 | Sluetz | 29/470.3 |
| 3,780,412 | 12/1973 | Millard | 29/157.1 R |

Primary Examiner—C. W. Lanham
Assistant Examiner—Dan C. Crane
Attorney, Agent, or Firm—Frank J. Jordan

[57] ABSTRACT

Disclosed herein is a valve for regulation of a fluid consisting essentially of fluid passage members attached integrally to both sides of a valve casing by means of frictional pressure-welding. The above casing includes a back pressure chamber and the spacing between the fluid passage members and the back chamber define stay chambers inside the joint sections at both sides which mitigate shock and damaging effects by hydraulic inertia to the valve, and prolong its life.

3 Claims, 3 Drawing Figures

METHOD OF MANUFACTURING A VALVE

BRIEF DESCRIPTION OF THE INVENTION

This invention relates generally to a valve for regulation of a fluid in combination with pipings, fittings and other associated devices.

More particularly, the present invention relates to a novel valve in which fluid passage members are contacted to peripheral edge sections of fluid passages provided at both sides of a back pressure chamber of a valve casing. The fluid pressure members are rotated at a high speed so as to thereby cause high heat of friction, and then pressure-welded thereto integrally.

The fluid passage members have spacings which correspond to spacings provided inside the back pressure chamber along the peripheries thereof, and these spacings define stay chambers at both sides of the valve casing when the fluid passage members are pressure-welded to both sides of the valve casing. The stay chambers thus function to reduce hydraulic pressure of a fluid.

A primary object of the present invention is directed to facilitate provision of fluid passages and spacings at both sides of a valve casing which has a valve stem incorporated in an internal back pressure chamber. To accomplish this object, the present invention involves the steps of contacting inlet and outlet fluid passage members to the peripheral edge sections of fluid passages and spacings of the valve casing, said fluid passage members having fluid passages and spacing corresponding to those of the valve casing. The fluid passage members are rotated at a high speed so as to cause high heat of friction; and then the fluid passage members are pressure welded integrally with the valve casing.

With such a structure, the valve in accordance with the invention ensures perfect airtight and lessens problems and damages.

Spacings provided on the fluid passage members and at both sides of the valve casing define stay chambers at both joint sections in path of fluid passage when the fluid passage members are pressure-welded to the valve casing. Each of the stay chambers so formed functions to cause vortex flow and reflux therein, reduce temperature and pressure when a high pressure high temperature fluid is passed therethrough, mitigate physical influences over the valve and associated devices such as expansion, shrinkage, etc., and prevent occurrence of strain and prolong durability of the valve.

In the present invention a square bar made of various metals can be used conveniently for machining the valve casing as well as the fluid passage members.

These and other advantages of the present invention will become apparent upon reading of the following detailed description of preferred embodiments.

BRIEF DESCRIPTION OF THE DRAWINGS

Preferred embodiments of this invention are illustrated in the accompanying drawings in which.

DETAILED DESCRIPTION OF THE PREFERRED EMBODIMENTS

Figure 1:
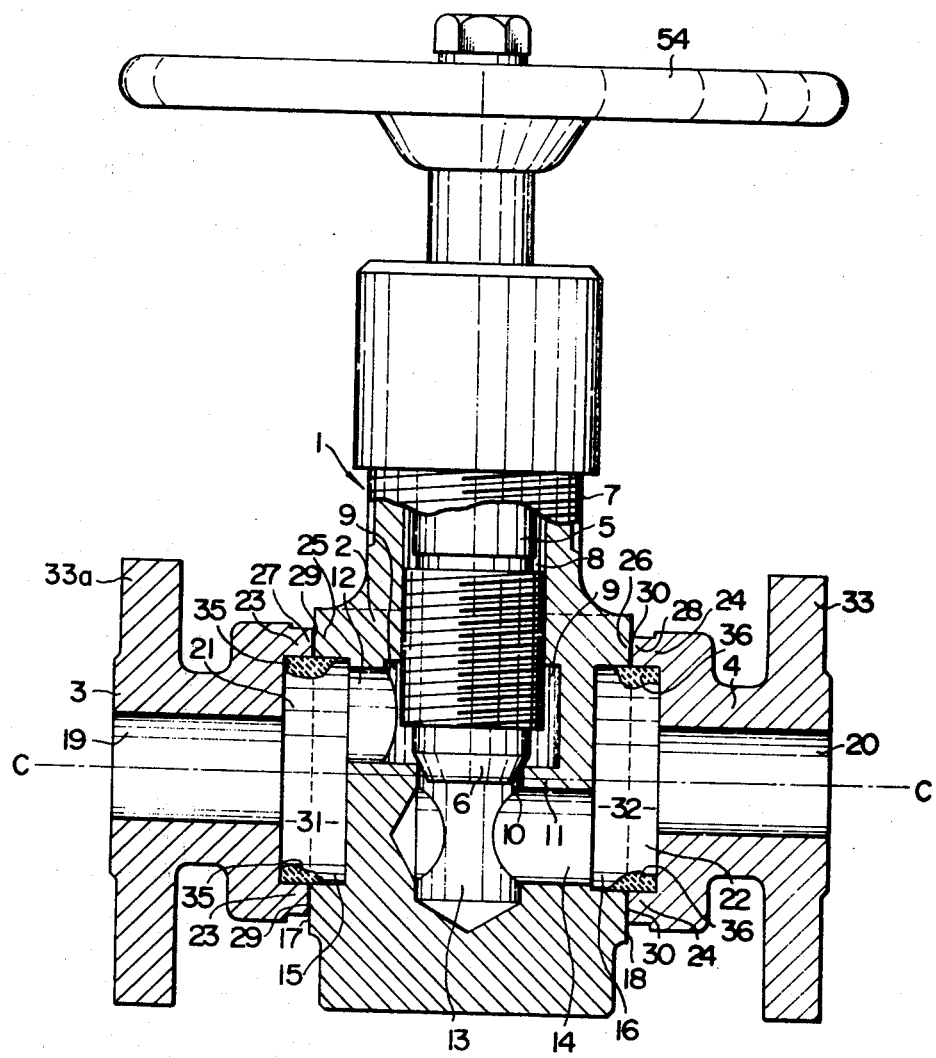
FIG. 1 is a vertical sectional view showing a principal structure of a valve in which flanged-end type fluid passage members are employed.

Referring now to FIG. 1 which illustrates an embodiment of a valve of this invention, there is shown a valve 1 of the invention which consists essentially of a valve casing 2, right and left fluid passage members 3, 4 a valve stem 5, and a valve body. The valve casing 2 has rectangular cubic surfaces at the right and left sides thereof where they connect respectively to the right and left fluid passage members 3 and 4, each having the same cylindrical shape. At an upper section of the valve casing there is provided a valve stem insert 7 which has an annular cross section.

Inside the valve casing 2, the valve stem 5 is inserted vertically into an insert chamber 8, and a back pressure chamber 9 traverses the valve casing in a horizontal direction. The back pressure chamber 9 embraces a valve seat 11 which has an orifice 10 bored at the bottom thereof. This orifice 10 is opened or closed when the valve body 6 is moved vertically by manipulation of a handle 54.

At one side of the back pressure chamber 9, a fluid passage 12 is provided in an eccentric relation with respect to the axis 0 — 0 of the fluid passage members 3 and 4, and communicated to a cylindrical spacing 15 which is bored through the outer wall of the valve casing and which has a large diameter than the diameter of the fluid passage 12.

The lower section of the valve seat 11 downstream of the orifice 10 defines a vertical passage 13 interconnecting a transversal passage 14 which is provided in an eccentric relation relative to the above-mentioned axis 0 — 0. In other words, the transversal passage 14 connects to a cylindrical spacing 16 in an eccentric relation which is provided along the axis of the outer wall of the valve casing 2. In this manner the two fluid passages 12 and 14 are positioned symmetrically with each other on a diagonal line with the valve seat 11 as the center whereby the two spacings 15 and 16 are defined on the outer walls of the valve casing in the same size of circle which has, as its axis, the center line of the valve seat 11, that is to say, the axis 0 — 0.

Around the peripheries of the cylindrical spacings 15 and 16 that are provided respectively adjacent the outer walls 17 and 18 of the right and left sides of the valve casing 2, each of the aforementioned fluid passage members 3 and 4 is attached by rotating at a high speed effecting pressure welding thereto by means of a so-called frictional pressure-welding method.

Each of the fluid passage members 3 and 4 is equipped with a flange 33a, 33 respectively whereby the left fluid passage member functions as an inlet while the right fluid passage member functions as an outlet. Since both of the fluid passage members have the same construction, each may be replaced by the other. Each of the fluid passage members 3 and 4 has a cylindrical shape and incorporates a fluid passage 19, 20 having the axis 0 — 0 as its center and also are provided with and interconnecting cylindrical spacing 21, 22 corresponding respectively to the cylindrical spacing 15, 16 of the valve casing 12. The peripheral walls 23, 24 of the cylindrical spacing 21, 22 project form the fluid passage members 3, 4 in the form of a ring.

Namely, the peripheral surfaces 27, 28 of the ring-shaped peripheral walls 23, 24 are pressure-welded to the peripheral surfaces 25, 26 on the cylindrical spacing 15, 16 defined on the outer wall of the valve casing 2 adjacent the cylindrical spacing 15, 16.

Frictional pressure-welding is effected in the manner described. While the valve casing 2 is maintained stationary, each of the fluid passage member 3, 4 is attached thereto by registering the axis 0 — 0 with each other. Under these conditions each fluid passage member 3, 4 is rotated at a high speed whereby friction of the two materials generates high heat which, in turn, brings them into a molten state, and makes it possible to effect pressure-welding of the two materials while they are being pressed.

In the present invention, when the two materials reach the molten state, the valve casing is allowed to turn together with the fluid passage member 3, 4. The welded section 29, 30 of the two materials are integrated tightly so that each section would not be detachable from the other irrespective of the types of metals used for the two materials.

With such arrangements the cylindrical spacings 15 and 16 of the valve casing 2 are put together with the cylindrical spacings 21 and 22 of the fluid passage members 3 and 4 thereby defining stay chambers 31, 32 respectively on the left and right sides of the valve casing. The pressure-welding forms casting fins 35, 36 at the joint sections inside the stay chamber 31 and 32 which, after being solidied, however, render no problems for passage of a fluid and, on the contrary, contribute to cause vortex flow inside the fluid passage.

When the passage 19 of the fluid passage member 3 is used as the inlet side, fluid is led into the back pressure chamber 9 via the stay chamber 31 and the passage 12, through the orifice 10 of the valve seat 11, and discharged the the outlet of the passage 20 of the passage member 4 after passing through the other stay chamber 32 and the passages 13 and 14.

The fluid may naturally be passed through in the opposite direction. Flow rate as well as velocity of the fluid in this instance can be regulated as desired by regulating the orifice 10 by means of adjusting the valve body 5.

Figure 2:
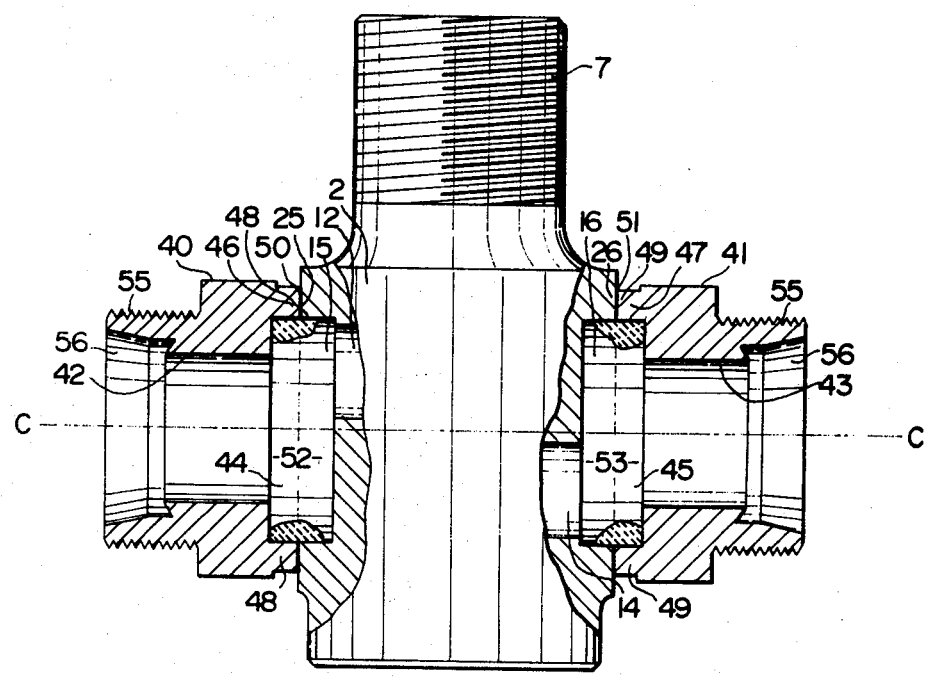
FIG. 2 is also a vertical sectional view showing a valve having the same structure as the valve shown in FIG. 1 except that fluid passage members are of the screwed-end type.

The embodiment shown in FIG. 2 has principally the same structure as the valve of FIG. 1; hence like numerals are used to identify like members. The valve in this embodiment differs from the valve of the former embodiment in that the fluid passage members 3, 4 are provided with threads to ensure an easier installation to pipes or conduits. Namely the fluid passage members 40 and 41 have respectively, cylindrical passages 42 and 43 along the axis C — C as the center, and also cylindrical spacings 44 and 45 thereinside respectively which corresponds to cylindrical spacings 15 and 16 of the valve casing 2 and which communicate with the passage 12 and 14 respectively in an eccentric relation with respect to the axis C — C.

In the like manner as in the former embodiment, the peripheral surfaces 48 and 49 of the ring-shaped peripheral edges 46 and 47 are frictionally pressure-welded onto the peripheral edges 25 and 26 of the valve casing 2 adjacent the cylindrical spacings 15 and 16 to integrate the joint sections 50 and 51 thereby forming stay chambers 52 and 53 at both sides.

Screw 55 or fitting section 56 may be formed on the outer surface of the passage member 40, 41 in order to provide easier fitting of the valve to pipings and various associated devices.

According to the present invention, the valve casing of the valve in the above-mentioned embodiment as well as another embodiment to follow can be machined very easily from a round or square bar of various metals. Machining can naturally be made without any difficulty for those members such as the insert chamber 8, back pressure chamber 9, passages 12, 13, 14 and cylindrical spacing 15, 16.

The valve casing upon completion of prescribed machining is then pressure-welded and finished to the fluid passage members 3, 4 having respectively the cylindrical spacings 21 and 22.

Thus in accordance with the present invention, a valve having an excellent mechanical strength can be produced in an extremely easy manner. In addition, the stay chambers 31, 32 provided in the way of a fluid passage mitigate shock and damaging effects by hydraulic inertia immediately before and after change of velocity and volume of a fluid, and ensures the valve with sufficient resistance against corrosion and errosion.

Figure 3:
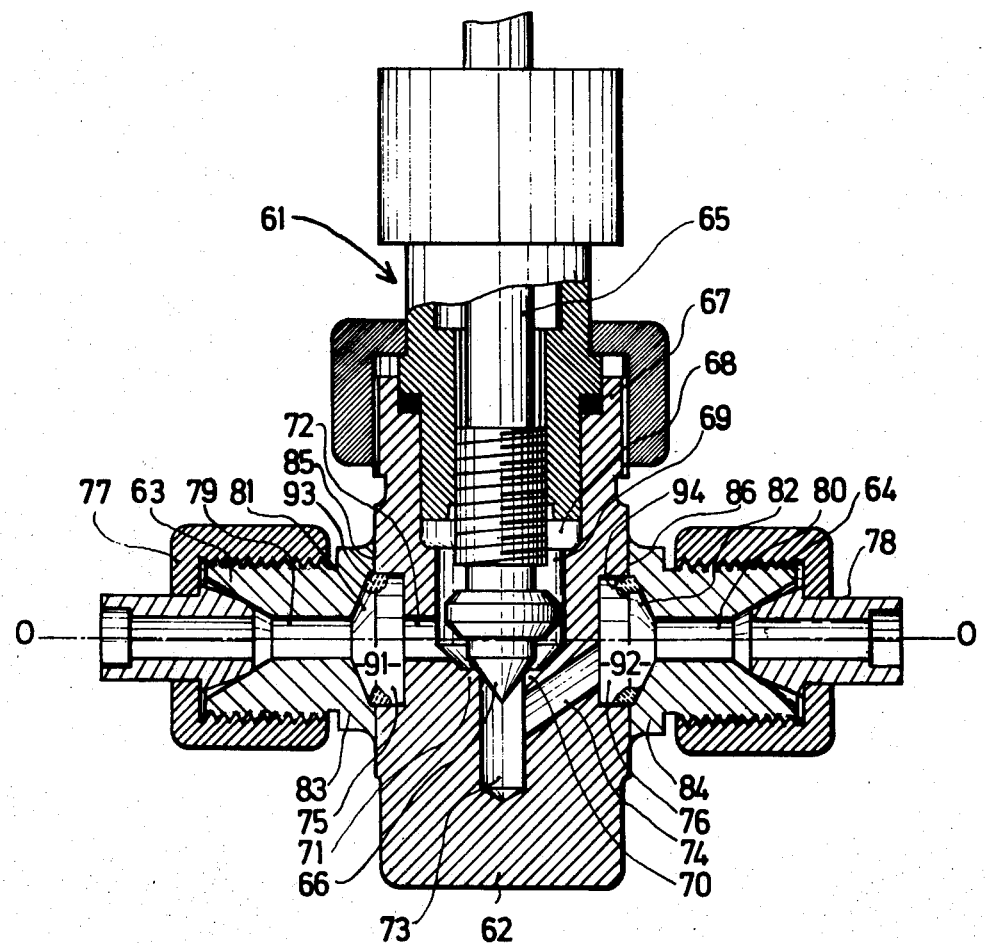
FIG. 3 is a vertical sectional view of another embodiment of a valve in accordance with the present invention which incorporates an oblique passage inside a valve casing.

FIG. 3 illustrates another embodiment of a valve 61, in accordance with the present invention which comprises a valve casing 62, fluid passage members 63, 64 provided at both sides of the casing, a valve stem 65, a valve body 66, and a valve seat 71. The valve casing 62 and the fluid passage members 63, 64 have the same surface structure a that of the former embodiment.

Inside the valve casing 62, a valve stem insert section 67 incorporates a valve stem insert chamber 68 accommodating a valve stem 65 and leading to a back pressure chamber 69. A valve seat 71 is provided at the bottom of the back pressure chamber, and has an orifice 70 bored therethrough. The orifice 70 is opened or closed when a valve body 66 is moved up and down. At an internal side section of the back pressure chamber 69, there is disposed a fluid passage 72 in the arrangement such that its center line corresponds to the axis 0 — 0 of the fluid passage members 63 and 64.

A cylindrical spacing 75 is bored on an outer side wall of the value casing 62, and connects to the above-mentioned passage 72. Further downstream the orifice 70 of the valve seat 71, a vertical passage 73 is provided so as to communicate with an oblique passage 74 which is positioned aslant with respect to the axis 0 — 0. This oblique passage 74 leads to a cylindrical spacing 76 provided at the other side of the valve casing 62.

Preferably the two cylindrical spacings 75 and 76 are provided on the outerwall of both sides of the valve casing in a same size and shape having the axis 0 — 0 as the center line. It is advisable that the cylindrical spacings 75, 76 have a larger diameter than each of the fluid passages 72, 73 and 74 which have the same diameter.

The fluid passage members 63, 64 are contacted to both sides of the valve casing around the cylindrical spacings 75, 76 and then pressure-welded thereto in the like manner as in the previous embodiment.

Fluid passages 79, 80 provided respectively in the fluid passage members 63, 64 along the axis thereof have cylindrical spacings 81, 82. These spacings correspond respectively to the cylindrical spacings 75, 76 of the valve casing, and have a ring-like shape around the periphery. While these spacings are fitted to their counter-part respectively, each of the fluid passage members 63, 64 is frictionally pressure-welded to the valve casing integrally in the aforementioned manner, whereby each of the cylindrical spacing together with its counter-part defines a stay chamber 91, 92 inside each of the joint sections. In this instance, casting fins 93, 94 is formed inside each of the stay chambers so formed.

Thereafter a feed pipe 77 and a discharge pipe 78 are properly fitted to the fluid passage members 63, 64. Thus, a fluid is fed from the passages 79 to the back pressure chamber 69 via the stay chamber 91, and then discharged from the passage 80 after having passed the orifice 70, vertical passage 73, oblique passage 74, and stay chamber 92.

The valve in this embodiment differs from the valve of the previous embodiments in that the passage 72 at one internal side of the valve casing is aligned on the axis 0 — 0 while the passage 74 on the other internal side of the casing is inclined aslant upwardly. This arrangement however is simply for the ease of machining, and the passage 72 can also be located aslant in symmetry with the passage 74 with the valve stem as its center. Likewise an oblique passage may be formed at the inflow side whereby a transversal passage is to be formed at the discharge side in a direction of the axis. In either of the cases, provision of an oblique passage enhances the effect of the present invention because it helps cause vortex flow and reflux greatly inside the fluid passage.

I claim:
1. A method of making a valve comprising the steps of forming a valve body with a body inlet passage opening up on one side of said valve body into a larger diameter body inlet stay passage with a body outlet passage opening up on the other side of said valve body into a larger diameter body outlet stay passage, forming a fluid inlet member with an inlet passage opening up one side thereof into a larger diameter inlet stay passage, forming a fluid outlet member with an outlet passage opening up on one side thereof into a larger diameter outlet stay passage, aligning said fluid inlet member with said body inlet passage such that said body inlet stay passage is generally axially with said inlet member stay passage, aligning said fluid outlet member with said body outlet passage such that said body outlet stay passage is generally axially aligned with said outlet member stay passage, rotating said fluid inlet and fluid outlet members at high speed relative to said valve body while applying axial pressure urging said fluid inlet and fluid outlet members towards said valve body, producing molten material at the interface between said valve body and said fluid inlet and fluid outlet members resulting from friction therebetween and said applied axial pressure, passing said molten material into said aligned stay passages, and pressure welding said fluid inlet and fluid outlet members to said valve body utilizing the high frictional heat and pressure to effect the weld.

2. A method according to claim 1 wherein said valve body is maintained stationary prior to formation of said molten material, and rotating said valve body along with said fluid inlet and outlet members after said molten material has been formed.

3. A method according to claim 1 wherein said stay passages are of substantially the same diameter, said molten material being disposed in the outer peripheral portions of said stay passages and being disposed radially outwardly of said inlet passage and said outlet passage in said fluid inlet member and said fluid outlet member respectively.

* * * * *